(12) United States Patent
Leech (10) Patent No.: US 9,457,246 B2
(45) Date of Patent: *Oct. 4, 2016

(54) GOLF AID INCLUDING HEADS UP DISPLAY
(71) Applicant: NIKE, Inc., Beaverton, OR (US)
(72) Inventor: Nicholas A. Leech, Beaverton, OR (US)
(73) Assignee: NIKE, Inc., Beaverton, OR (US)
( * ) Notice: Subject to any disclaimer, the term of this patent is extended or adjusted under 35 U.S.C. 154(b) by 465 days.

This patent is subject to a terminal disclaimer.

(21) Appl. No.: 13/971,211
(22) Filed: Aug. 20, 2013
(65) Prior Publication Data
US 2014/0038750 A1 Feb. 6, 2014

Related U.S. Application Data (63) Continuation of application No. 13/341,442, filed on Dec. 30, 2011, now Pat. No. 8,540,583.

(51) Int. Cl.
| | |
|---|---|
| A63B 69/36 | (2006.01) |
| A63B 37/08 | (2006.01) |
| A63B 43/00 | (2006.01) |
| A63B 57/00 | (2015.01) |
| A63B 24/00 | (2006.01) |
| G02B 27/01 | (2006.01) |
| A63B 37/00 | (2006.01) |
| A63B 43/06 | (2006.01) |
| G01S 17/74 | (2006.01) |
| G01S 17/89 | (2006.01) |
| G06F 3/01 | (2006.01) |
| G06F 3/03 | (2006.01) |
| G06F 3/0346 | (2013.01) |

(Continued)

(52) U.S. Cl.
CPC ........... *A63B 57/00* (2013.01); *A63B 24/0021* (2013.01); *A63B 37/0072* (2013.01); *A63B 43/008* (2013.01); *A63B 43/06* (2013.01); *A63B 69/36* (2013.01); *A63B 71/0619* (2013.01); *G01S 17/74* (2013.01); *G01S 17/89* (2013.01); *G02B 27/017* (2013.01); *G06F 3/011* (2013.01); *G06F 3/0304* (2013.01); *G06F 3/0346* (2013.01); *A63B 2024/0025* (2013.01); *A63B 2024/0028* (2013.01); *A63B 2024/0053* (2013.01); *A63B 2071/0666* (2013.01); *A63B 2220/12* (2013.01); *A63B 2220/802* (2013.01); *A63B 2220/805* (2013.01); *A63B 2220/806* (2013.01); *A63B 2220/833* (2013.01); *A63B 2220/836* (2013.01); *A63B 2225/50* (2013.01); *A63B 2225/54* (2013.01); *G01S 13/89* (2013.01); *G02B 2027/014* (2013.01); *G02B 2027/0138* (2013.01); *G02B 2027/0178* (2013.01)

(58) Field of Classification Search
USPC .................. 473/152, 199, 353, 407, 409
See application file for complete search history.

(56) References Cited

U.S. PATENT DOCUMENTS

| | | |
|---|---|---|
| 3,804,411 A | 4/1974 | Hendry |
| 4,614,340 A | 9/1986 | Hosoya |
| 5,342,051 A | 8/1994 | Rankin et al. |

(Continued)

*Primary Examiner* — Nini Legesse
(74) *Attorney, Agent, or Firm* — Quinn Law Group, PLLC (57) ABSTRACT

A golf aid includes a user tracking system configured to determine the location of a user on a golf course, a processor, and a heads up display. The heads up display is configured to be worn on the user's head, and to display an image within a field of view of the user. The processor is in communication with the user tracking system and with the heads up display, and configured to determine a distance between the location of the user and an object, and provide an indication of the determined distance to the user via the heads up display.

20 Claims, 7 Drawing Sheets

(51) Int. Cl.
  *A63B 71/06* (2006.01)
  *G01S 13/89* (2006.01)

(56) References Cited

U.S. PATENT DOCUMENTS

| | | | |
|---|---|---|---|
| 5,423,549 A | 6/1995 | Englmeier | |
| 5,564,698 A | 10/1996 | Honey et al. | |
| 5,781,505 A | 7/1998 | Rowland | |
| 5,910,057 A | 6/1999 | Quimby et al. | |
| 5,912,700 A | 6/1999 | Honey et al. | |
| 6,579,190 B2 | 6/2003 | Yamamoto | |
| 6,634,959 B2 | 10/2003 | Kuesters | |
| 7,138,963 B2 | 11/2006 | Hobgood et al. | |
| 7,207,902 B1 | 4/2007 | Hamlin | |
| 7,595,933 B2 | 9/2009 | Tang | |
| 7,811,163 B2 | 10/2010 | Ratcliffe | |
| 7,855,638 B2 | 12/2010 | Huston | |
| 7,946,926 B1 | 5/2011 | Balardeta et al. | |
| 8,400,346 B2 | 3/2013 | Hubbard et al. | |
| 8,540,583 B2 * | 9/2013 | Leech | A63B 57/00 473/152 |
| 2002/0177490 A1 | 11/2002 | Yong et al. | |
| 2004/0212630 A1 | 10/2004 | Hobgood et al. | |
| 2005/0101411 A1 | 5/2005 | Stiller et al. | |
| 2005/0233815 A1 | 10/2005 | McCreary et al. | |
| 2006/0105857 A1 * | 5/2006 | Stark | A63B 24/0021 473/353 |
| 2006/0116185 A1 | 6/2006 | Krull | |
| 2007/0021226 A1 | 1/2007 | Tyroler | |
| 2007/0032306 A1 | 2/2007 | Zanzucchi et al. | |
| 2008/0220892 A1 | 9/2008 | Williamson et al. | |
| 2008/0254916 A1 | 10/2008 | Kim et al. | |
| 2009/0017944 A1 | 1/2009 | Savarese et al. | |
| 2009/0213038 A1 | 8/2009 | Huang et al. | |
| 2010/0103075 A1 * | 4/2010 | Kalaboukis | A63F 13/02 345/8 |
| 2010/0151955 A1 | 6/2010 | Holden | |
| 2012/0236031 A1 * | 9/2012 | Haddick | G02B 27/0093 345/633 |
| 2013/0130843 A1 * | 5/2013 | Burroughs | A63B 71/0686 473/415 |
| 2013/0137528 A1 | 5/2013 | Ishii et al. | |

* cited by examiner

GOLF AID INCLUDING HEADS UP DISPLAY

CROSS REFERENCE TO RELATED APPLICATIONS

This application is a continuation of and claims the benefit of priority from U.S. patent application Ser. No. 13/341,442, filed Dec. 30, 2011, which is hereby incorporated by reference in its entirety.

TECHNICAL FIELD

The present invention relates generally to a golf aid for conveying a distance between the user and an object via a heads up display.

BACKGROUND

The game of golf is an increasingly popular sport at both amateur and professional levels. Both amateur and professional golfers spend sizeable amounts of time developing the muscle memory and fine motor skills necessary to improve their game. Golfers try to improve their game by analyzing launch and trajectory information while playing golf. Golf balls are sometimes difficult to see when flying through the air on a golf course. Consequently, it can be difficult to track the trajectory of golf balls and to find golf balls after they have landed. Thus, it would be advantageous to provide a system for tracking a golf ball.

SUMMARY

A golf aid includes a user tracking system configured to determine the location of a user on a golf course, a processor, and a heads up display. The heads up display is configured to be worn on the user's head, and to display an image within a field of view of the user. The processor is in communication with the user tracking system and with the heads up display, and configured to determine a distance between the location of the user and an object, and provide an indication of the determined distance to the user via the heads up display.

In one configuration, the object may includes a pin on the golf course, where the approximate location of the pin may be stored within the processor. In another configuration, the object may be a golf ball to aid a golfer in locating his or her golf ball once hit.

The golf aid may further include a golf ball tracking system in communication with the processor. In one configuration, the golf ball tracking system is configured to track the motion of a golf ball using at least one of radar, LIDAR, optical sensing, and sonar. In other configurations, it may use GPS, or wireless communications.

The golf ball tracking system may be configured to determine one or more launch characteristics or flight characteristics of the golf ball. The processor may then provide an indication of the one or more determined launch characteristics or flight characteristics to the user via the heads up display. Such characteristics may include, for example, initial speed, launch angle, and/or spin rate.

The golf ball tracking system may be configured to track the location of the golf ball relative to the user, to enable the processor to provide an indication of the location of the golf ball within the field of view of the user via the heads up display. This indication may be imposed upon a real world view of the user (i.e., such as with a transparent or partially transparent display). The indication may include at least one of: a comet tail trailing behind the location of the ball within the user's real world view; and an enhanced image of the golf ball that overlays the location of the golf ball within the user's real world view.

The above features and advantages and other features and advantages of the present invention are readily apparent from the following detailed description of the best modes for carrying out the invention when taken in connection with the accompanying drawings.

DETAILED DESCRIPTION

A system for tracking a golf ball is disclosed. The system may track the trajectory of a golf ball and display an enhanced image of the golf ball on a display such that the enhanced image is imposed upon a user's real world view. Displaying an enhanced image of the golf ball may help a user view the trajectory of the golf ball and find the golf ball after the golf ball lands. In some embodiments, the system may display an enhanced image of the golf ball on a heads-up display configured to be worn on a person's head. For example, the heads-up display may include a pair of eyeglasses having a lens. By displaying an enhanced image of the golf ball on the lens, the user may view the enhanced image while remaining hands-free. The enhanced image may include at least a portion of the trajectory of the golf ball. Thus, the enhanced image may facilitate tracking the trajectory of the golf ball, which may help the user to compare the golf ball's trajectory with an ideal trajectory. The enhanced image may also help the user see where the golf ball lands, which may help a user find the golf ball. The system may display other information, such as launch and flight information about the ball, on the heads-up display.

Figure 1:
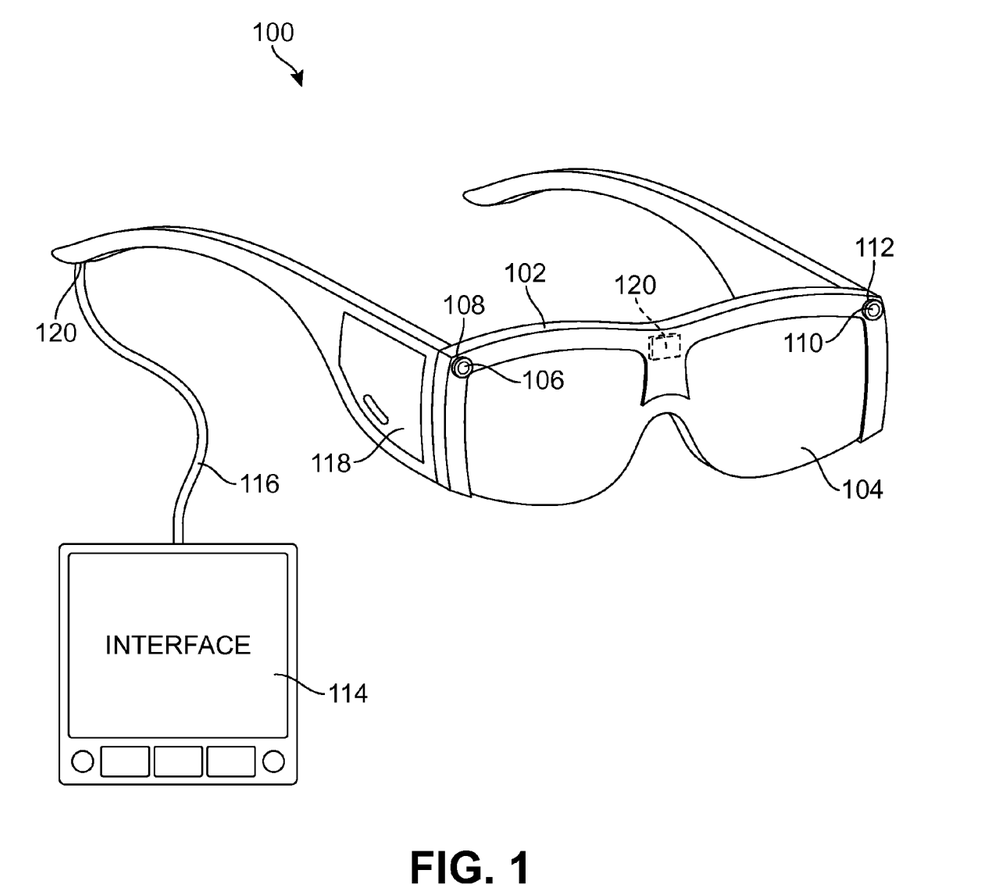
FIG. 1 shows a schematic partially perspective view of embodiment of the disclosed system.
Figure 2:
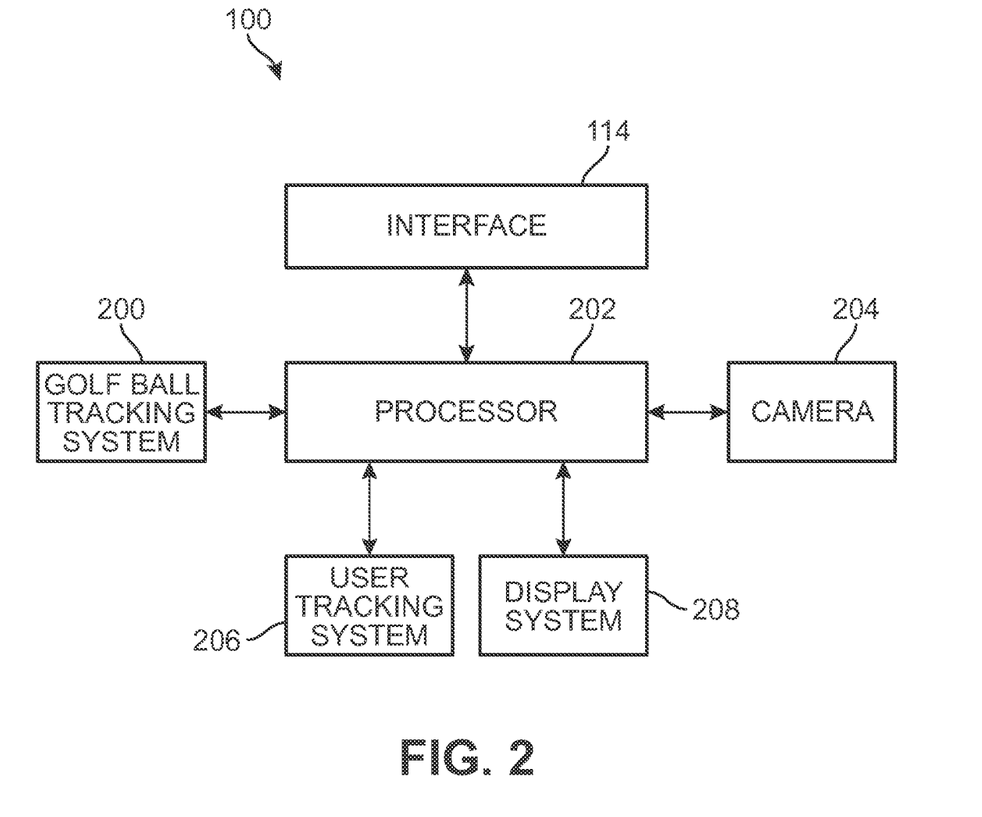
FIG. 2 is a schematic diagram of the embodiment of FIG. 1.

FIGS. 1 and 2 illustrate an embodiment of a system 100 for tracking a golf ball. System 100 may include a display device configured to be worn on a person's head. As shown in FIG. 1, the display device may include a pair of eyeglasses 102. For example, the display device may include any of the head mounted displays described in U.S. Pat. No. 7,595,933, entitled Head Mounted Display System, issued to Tang on Sep. 29, 2009, the disclosure of which is hereby incorporated by reference in its entirety. A display system 208 may be associated with eyeglasses 102 to display images to the user. System 100 may include a golf ball tracking system 200 to track the location of a golf ball. System 100 may include a user tracking system 206 to track the location of the user to help navigate and/or determine distances between the user and landmarks, such as the next pin on the golf course. System 100 may include a camera 204 configured to capture and record images of the user's real world view to determine where to display enhanced images to the user such that the enhanced images are imposed upon the user's real world view. System 100 may include an interface 114 to enable a user to communicate with system 100. System 100 may include at least one processor 202 configured to control camera 204, golf ball tracking system 200, user tracking system 206, and/or display system 208. In some embodiments, processor 202 may be coupled to camera 204, golf ball tracking system 200, user tracking system 206, and/or display system 208. In some embodiments, processor 202 may be configured to communicate with camera 204, golf ball tracking system 200, user tracking system 206, and/or display system 208. In some embodiments, system 100 may include more than one processor. For example, in some embodiments, a separate processor may be included for each component of system 100.

While the embodiment of FIG. 1 includes eyeglasses 102, other embodiments may include other types of display devices configured to be mounted on a person's head. For example, system 100 may include a visor, helmet, or goggles. The type of display device may be selected based on a variety of factors. For example, the type of display device may be selected based on the type of environment system 100 is meant to be used in. Components of system 100 may be mounted to eyeglasses 102. Eyeglasses 102 may be hollow such that components of system 100 may be housed within eyeglasses 102. In some embodiments, eyeglasses 102 may include a removable cover 118 for allowing access to any components mounted within eyeglasses 102. Eyeglasses 102 may include one or more lenses. FIG. 1 shows eyeglasses 102 with a single lens 104. In some embodiments, lens 104 may include a partially reflective mirror. The partially reflective mirror may allow the real world to be seen through the reflected surface such that a transparent image may be imposed upon a real world view.

Display system 208 may be mounted on and housed within eyeglasses 102. In some embodiments, display system 208 may include optical components, projecting components, imaging devices, power sources, and/or light sources. For example, display system 208 may include the components as described in U.S. Pat. No. 7,595,933. In some embodiments, display system 208 may include components that display images. For example, display system 208 may include a display element, such as a flat panel display or a liquid crystal display, as described in U.S. Pat. No. 7,595,933. In some embodiments, lens 104 may include a lens system that relays images to a user's eye from a display element.

User tracking system 206 may include one or more user location sensors 120. User location sensor 120 may sense the location of the user. User location sensor 120 may be mounted on and housed within eyeglasses 102. User location sensor 120 may be positioned in any suitable position. The type of user location sensor may include any suitable type of sensor. For example, user location sensor 120 may include a global positioning system receiver. The location, number, and type of user location sensor(s) may be selected based on a number of factors. For example, the type of user location sensor(s) may be selected based on the other types of components included in system 100. In some embodiments, processor 202 may be configured to communicate with user location sensor 120 to determine the location of the user on a golf course and to determine the distance between the user and a landmark on the golf course. For example, in some embodiments, processor 202 may be configured to communicate with user location sensor 120 to determine the distance between the user and the next pin on the course. Such information would help a user find his yardages during a round of golf.

Golf ball tracking system 200 may include one or more golf ball sensors. The golf ball sensor may be configured to detect the golf ball. The golf ball sensor may be mounted on or housed within eyeglasses 102. For example, as shown in FIG. 1, a golf ball sensor 110 may be mounted such that golf ball sensor 110 is exposed through an opening 112 in eyeglasses 102. FIG. 1 shows golf ball sensor 110 as being mounted such that it will be positioned above the user's left eye when a user wears eyeglasses 102. In other embodiments, golf ball sensor may be positioned in any suitable position. The location and number of golf ball sensors may be selected based on a number of factors. For example, the location of the golf ball sensor may be selected based on the positioning of other components and/or the sensitivity of the golf ball sensor.

In some embodiments, the golf ball sensor may include a reflective sensor capable of detecting the location of a golf ball without any communication components being provided within the golf ball. For example, the golf ball sensor may include radar, LIDAR, optical, and/or sonar sensors. In some embodiments, the golf ball tracking system may include communication components provided inside and/or on the golf ball. Such golf ball tracking systems may include a golf ball sensor capable of detecting the location of a golf ball by detecting a tracking component provided within the golf ball. For example, the golf ball tracking system may include a radio-frequency identification system, a BLUETOOTH technology system, an infrared system, and/or global positioning system receiver.

In some embodiments, camera 204 may act as the golf ball tracking system. Camera 204 may find the contrast difference between the golf ball and the background of the ball as the golf ball travels. For example, camera 204 may find the contrast difference between the golf ball and the sky as the golf ball flies through the air.

In some embodiments, the golf ball tracking system may include a special coating on the golf ball. Such golf ball tracking systems may include a golf ball sensor capable of detecting the location of a golf ball by detecting the special coating provided on the golf ball. The special coating may include an ultraviolet sensitive paint and the golf ball sensor may include a camera configured to capture images illuminated by ultraviolet light only. For example, a UV transmitting, visible light blocking filter may be included over the camera lens so that only ultraviolet passes through the filter and all visible light is absorbed by the filter.

In some embodiments, the golf ball sensor and the user location sensor may include the same type of sensor. For example, the golf ball sensor and the user location sensor may both include an infrared system. Embodiments of golf ball tracking systems are described in more detail below.

Camera 204 may capture and record images from the user's viewpoint. The camera may include any suitable type of camera. The type of camera may be selected based on a variety of factors. For example, the type of camera may be selected based on the type of display included in the system or the type of golf ball tracking system used in the system. The camera may be mounted on or inside eyeglasses 102. For example, as shown in FIG. 1, a camera may be mounted inside eyeglasses 102 with a camera lens 106 exposed through an opening 108 in eyeglasses 102. FIG. 1 shows camera lens 106 as being mounted so that it will be positioned above the user's right eye when a user wears eyeglasses 102. In other embodiments, the camera may be positioned in any other suitable position. The location of the camera may be selected based on a number of factors. For example, the location of the camera may be selected to provide the camera lens in a position close to the user's eye so that the view from the camera is similar to the view from the user's eye.

In some embodiments, processor 202 may be configured to process information relayed to and from the golf ball sensor and/or the communication component provided with the golf ball. Processor 202 may use this information to determine the location of the golf ball. In some embodiments, the processor may also be configured to control display system 208. As a result, the processor may control the images shown by the display. In some embodiments, processor 202 may be configured to process information relayed to and from user location sensor 120. The processor may use this information to determine the location of the user. In some embodiments, the processor may determine the distance between the user and a landmark, such as the pin or a restroom. In some embodiments, processor 202 may be configured to process information relayed to processor 202 from camera 204. Processor 202 may use this information to display images captured and recorded by the camera to the user. Processor 202 may be configured to display enhanced images to the user.

In some embodiments, the system may include an interface 114 configured to communicate with components of the system. In some embodiments, the interface may be in communication with golf ball tracking system 200, camera 204, and/or eyeglasses 102 either directly or through processor 202. Interface 114 may be in communication with processor 202, golf ball tracking system 200, camera 204, and/or eyeglasses 102 either wirelessly or by wire. For example, FIG. 1 shows wire 116 extending through an opening 120 in eyeglasses 102. Wire 116 may couple interface 114 to processor 202. Interface 114 may provide the user with a way to control system 100. In some embodiments, interface 114 may have an interface display. Such an interface display may show information about control settings and commands for system 100. In some embodiments, interface 114 may have inputs for providing data and control signals to system 100. For example, interface 114 may have buttons. In some embodiments, system 100 may include a touch screen that provides both an interface display and an input. In some embodiments, a user may wear eyeglasses 102 and put interface 114 in his pocket during use.

Figure 3:
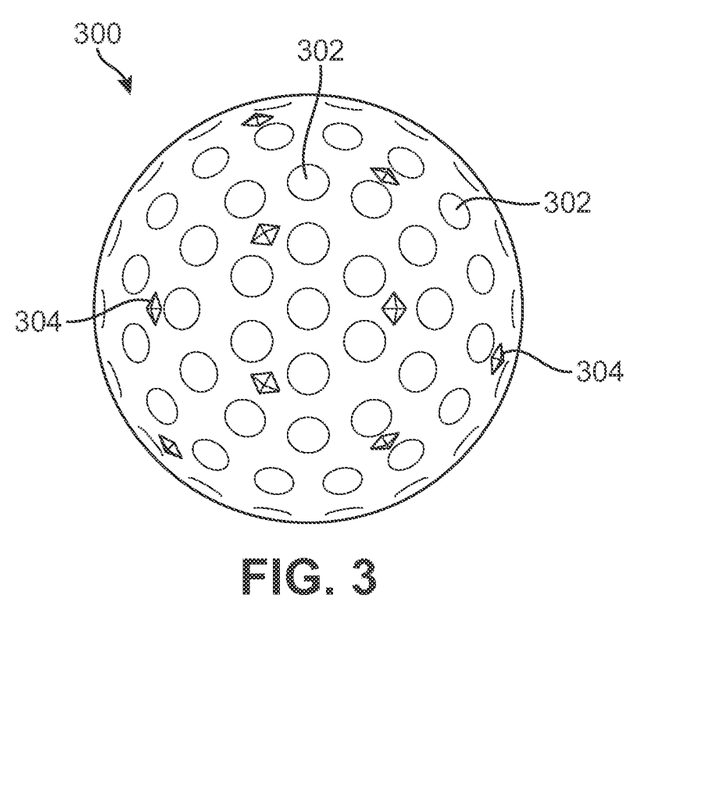
FIG. 3 shows a top view of a golf ball provided with communication components.
Figure 4:
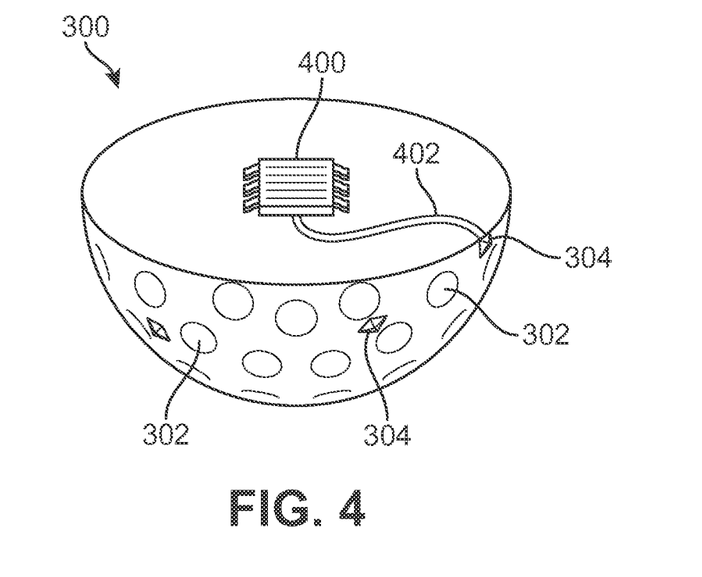
FIG. 4 shows a perspective partial cross sectional view of the golf ball of FIG. 3.

As discussed above, golf ball tracking system 200 may include a golf ball provided with communication components that are configured to communicate with a golf ball sensor. FIGS. 3 and 4 show a golf ball 300 that may be provided with communication components. Golf ball may include any suitable type of golf ball. For example, in some embodiments, golf ball 300 may be a one-piece golf ball. In other embodiments, golf ball 300 may be a multi-piece golf ball, such as a 2-piece or 3-piece golf ball. Golf ball 300 may have an outer surface including dimples 302. Golf ball 300 may be provided with communication components including emitting diodes 304 and a microchip 400. For example, the communication components may include those described in U.S. Pat. No. 6,634,959, entitled Golf Ball Locator, issued to Kuesters on Oct. 21, 2003, the disclosure of which is hereby incorporated by reference in its entirety, and as described in U.S. Pat. No. 5,564,698, entitled Electromagnetic Transmitting Hockey Puck, issued to Honey et al. on Oct. 15, 1996, the disclosure of which is hereby incorporated by reference in its entirety. Emitting diodes 304 may be disposed on the outer surface of golf ball 300. FIG. 4 shows a cross-sectional view of golf ball 300. As shown in FIG. 4, microchip 400 may be disposed inside golf ball 300. Emitting diodes 304 may be connected to microchip 400 by wires 402. In some embodiments, microchip 400 may be configured to power and control emitting diodes 304.

In some embodiments, microchip 400 may be configured to communicate with processor 202. For example, microchip 400 may be configured to communicate with processor 202 via wireless signals. In some embodiments, microchip 400 may include a power source, timing circuits, on/off switches, a pulsing circuit, and/or shock sensors to control the powering of emitting diodes 304. In such embodiments, the shock sensors may be configured to detect movement of golf ball 300. Accordingly, movement of golf ball 300 may trigger the on/off switch to power emitting diodes 304. To conserve power, timing circuits may be configured to control how long emitting diodes 304 are powered. Thus, shock sensors may detect when a golf club strikes golf ball 300, which may trigger the on/off switch to power emitting diodes 304 while golf ball 300 is in flight. After a predetermined amount of time, the timing circuits may trigger the on/off switch to shut off power to emitting diodes 304.

In embodiments in which golf ball 300 includes emitting diodes 304, golf ball sensor 110 may be configured to detect signals from emitting diodes 304. For example, emitting diodes 304 may include infrared emitting diodes and golf ball sensor 110 may include an infrared receiver. Golf ball sensor 110 may transmit this data to processor 202. Processor 202 may be configured to use this data to determine the location of emitting diodes 304, and thus, the location of golf ball 300. In some embodiments, in place of or in addition to golf ball sensor 110, camera 204 may be configured to detect emissions from emitting diodes 304. In some embodiments, in place of or in addition to golf ball sensor 110, multiple golf ball sensors may be provided in the location in which the golf ball is to be tracked. For example, multiple golf ball sensors may be provided in various positions on a golf course. In such embodiments, the position of the golf ball sensors may be known and the golf ball sensors may be used to determine the location of the golf ball by detecting emissions from emitting diodes 304.

Figure 5:
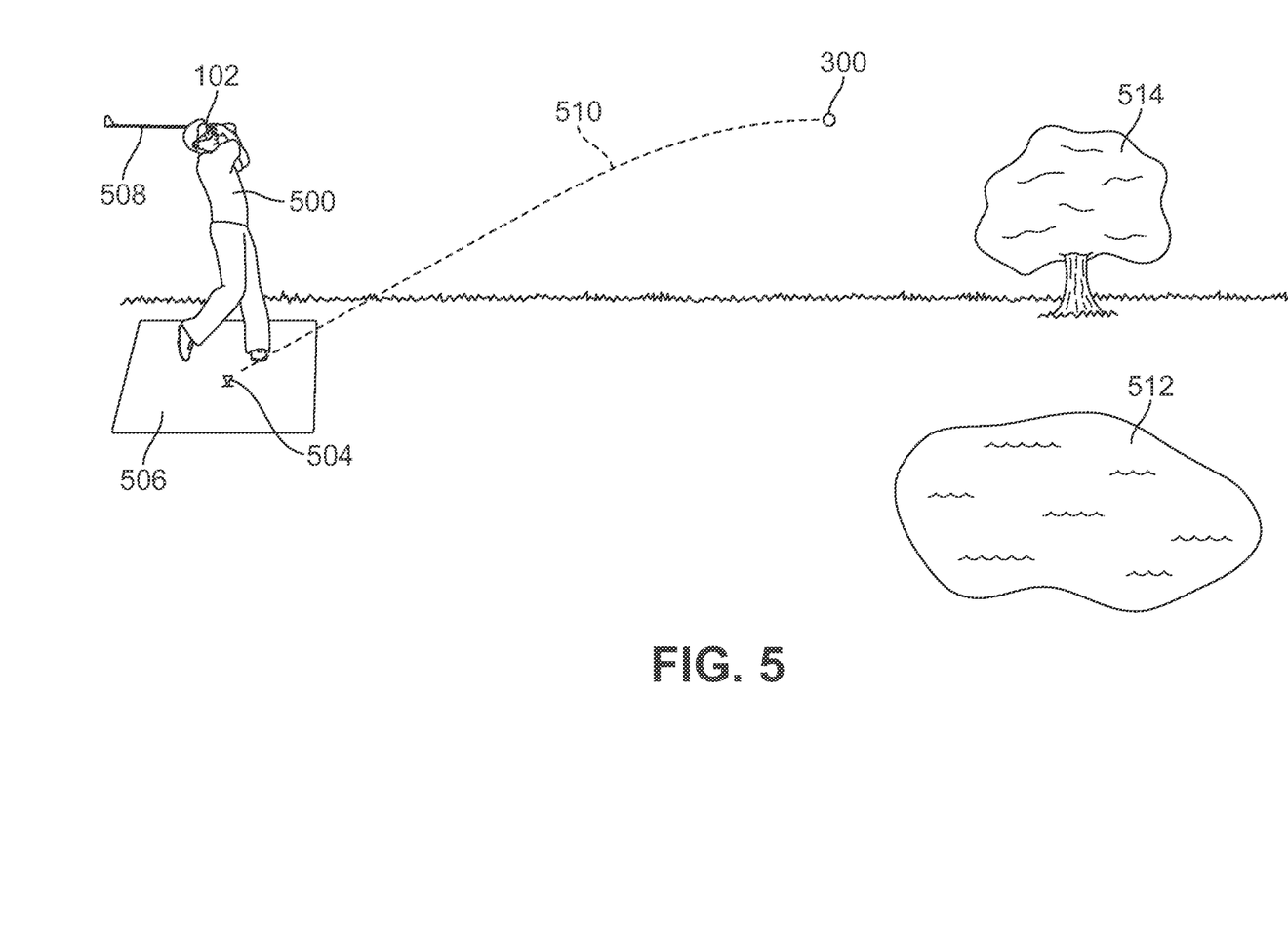
FIG. 5 shows a schematic side perspective view of a golfer wearing the system shown in FIGS. 1-2 and hitting the golf ball of FIGS. 3-4.
Figure 6:
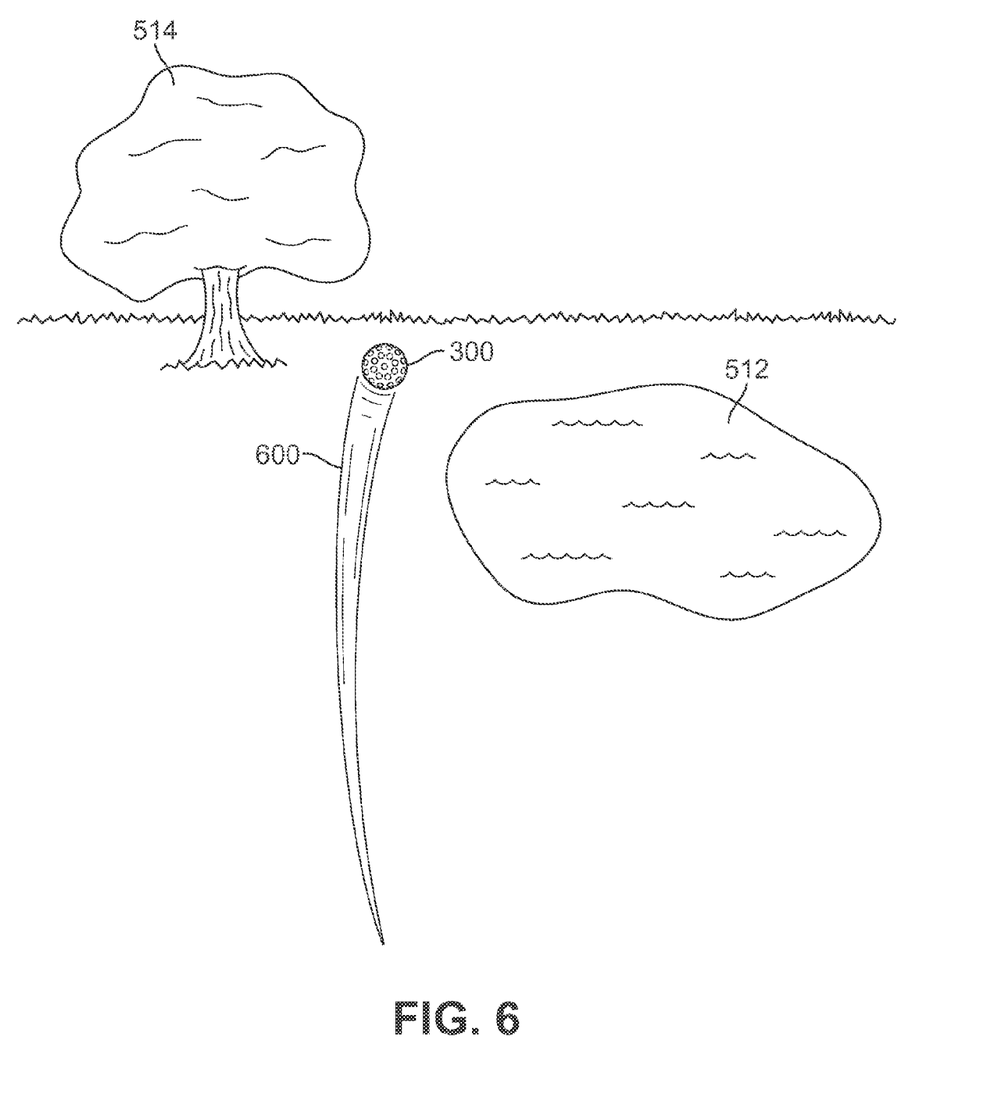
FIG. 6 shows an schematic enhanced image of the golf ball imposed upon the golfer's real world view.

FIG. 5 illustrates a user 500 wearing eyeglasses 102 while using a golf club 508 to hit a golf ball 300 off of a tee 504 in a tee box 506. FIG. 6 shows the user's view after he hits golf ball 300. Eyeglasses 102 provide an enhanced image of golf ball 300 imposed upon the user's real world view such that the enhanced image's position matches the position of golf ball 300. In FIG. 6, the user's real world view through lens 104 includes golf ball 300, a tree 514, and a pond 512 disposed within user's line of sight. The enhanced image adds a comet tail 600 to golf ball 300 as golf ball 300 flies through the air toward tree 514 and pond 512. Comet tail 600 may lag behind golf ball 300 such that comet tail 600 stays visible after golf ball 300 lands. Comet tail 600 may represent at least a portion of the trajectory of golf ball 300. In some embodiments, comet tail 600 may represent the entire trajectory of golf ball 300. As a result, user 500 may see the entire trajectory of golf ball 300 at least temporarily after golf ball 300 lands.

Figure 8:
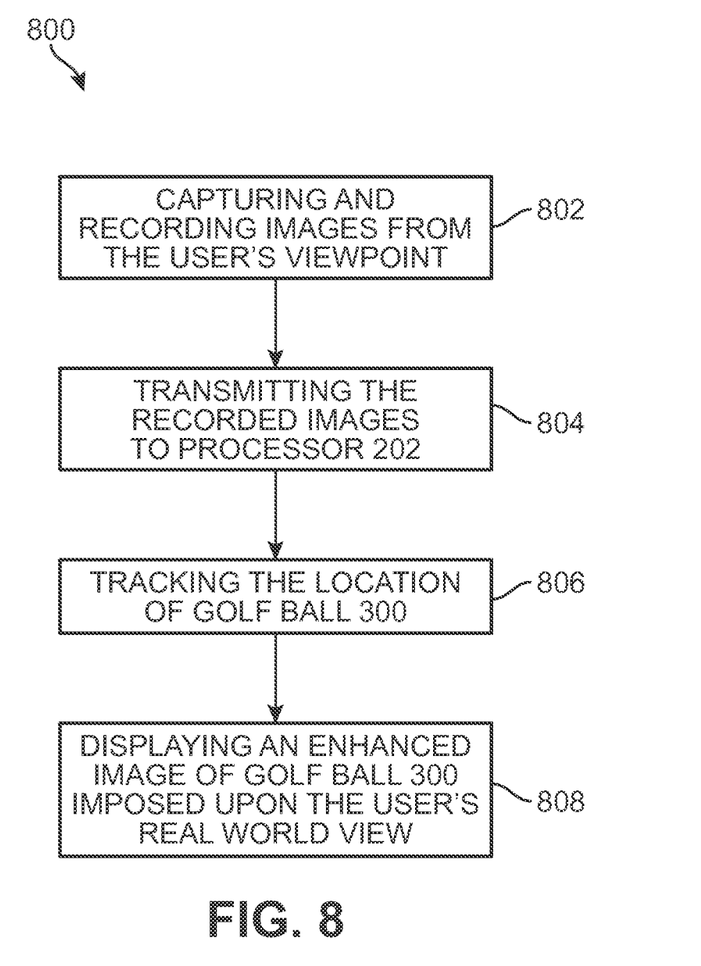
FIG. 8 shows a schematic flow chart of a method of displaying an enhanced image of the golf ball imposed upon the golfer's real world view according to an embodiment.

FIG. 8 shows a method 800 of displaying an enhanced image of the golf ball imposed upon the golfer's real world view according to an embodiment. The steps of method 800 may be performed in any order. Step 802 may include capturing and recording images from the user's viewpoint. Step 804 may include transmitting the recorded images to processor 202. Camera 204 may perform steps 802 and 804. Step 806 may include tracking the location of golf ball 300. Golf ball tracking system 200 and/or processor 202 may perform step 804. For example, in the embodiment discussed above with reference to FIGS. 3 and 4, hitting golf ball 300 may trigger shock sensors. As a result, on/off switches may cause microchip 400 to power emitting diodes 304, which may cause emitting diodes 304 to pulse. Golf ball sensor 110 may detect the pulses and transmit data to processor 202. Processor 202 may use the transmitted data to determine the location of emitting diodes 304, and thus, the location of golf ball 300.

Step 808 may include displaying an enhanced image of golf ball 300 upon the user's real world view. In some embodiments, processor 202 may use the location of golf ball 300 and the images recorded by camera 204 to make display system 208 display an enhanced image of golf ball 300 to user 500. The enhanced image may be displayed such that the enhanced image overlays the user's real world view. In some embodiments, the enhanced image may be transparent. In some embodiments, the enhanced image may be stereoscopic. In some embodiments, the enhanced image may be bigger and/or brighter than the recorded image. For example, the enhanced image may appear to be glowing. The enhanced image may be selected to make golf ball 300 and the trajectory of golf ball 300 stand out more to the user while allowing user to still see a real world view. As shown in FIG. 6, the enhanced image may include comet tail 600 trailing behind golf ball 300. Comet tail 600 may show the trajectory of golf ball 300 such that user 500 can compare the trajectory of golf ball 300 to an ideal trajectory. In some embodiments, display system 208 may display an ideal trajectory such that the trajectory of golf ball 300 may be compared with the ideal trajectory.

Figure 7:
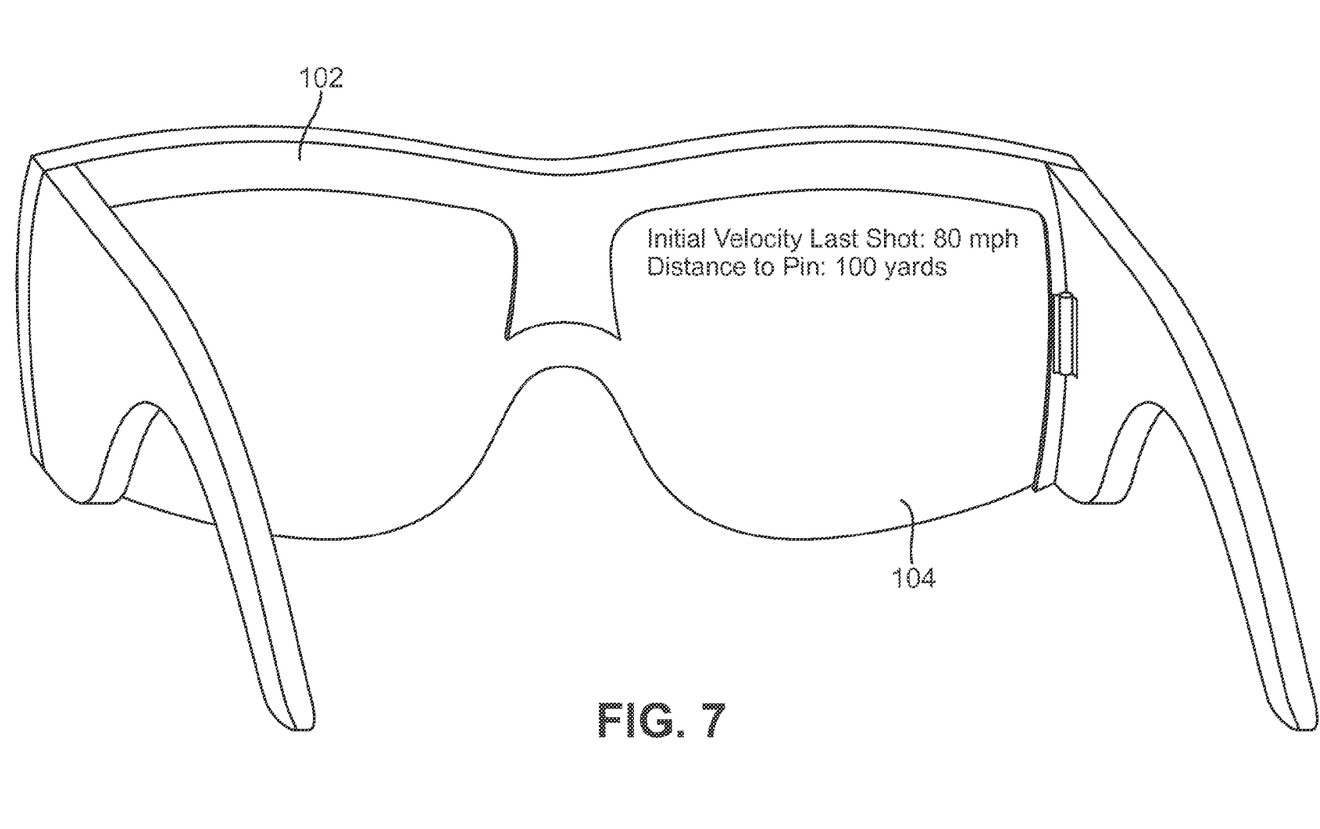
FIG. 7 shows a schematic perspective view of information displayed on the eyeglasses of FIGS. 1-2.

In some embodiments, processor 202 may use the location of golf ball 300 at various times to determine launch information and/or flight information about golf ball 300. In some embodiments, to determine launch information and/or flight information about golf ball 300, system 100 may use methods and components described in U.S. Patent Application Publication 2007/0021226, entitled Method of and Apparatus for Tracking Objects in Flight Such as Golf Balls and the Like, applied for by Tyroler and published on Jan. 25, 2007, the disclosure of which is hereby incorporated by reference in its entirety. In some embodiments, to determine launch information and/or flight information about golf ball 300, system 100 may use methods and components described in U.S. Patent Application Publication 2005/0233815, entitled Method of Determining a Flight Trajectory and Extracting Flight Data for a Trackable Golf Ball, applied for by McCreary et al. and published on Oct. 20, 2005, the disclosure of which is hereby incorporated by reference in its entirety. In some embodiments, to determine launch information and/or flight information about golf ball 300, system 100 may use methods and components described in U.S. Patent Application Publication 2010/0151955, entitled Global Positioning System Use for Golf Ball Tracking, applied for by Holden and published on Jun. 17, 2010, the disclosure of which is hereby incorporated by reference in its entirety. To determine launch information and/or flight information about golf ball 300, system 100 may use methods and components described in U.S. Patent Application Publication 2008/0254916, entitled Method of Providing Golf Contents in Mobile Terminal, applied for by Kim et al. and published on Oct. 16, 2008, the disclosure of which is hereby incorporated by reference in its entirety. FIG. 7 shows how information may be displayed to the user. For example, launch information, such as initial velocity, and the distance to the pin may be displayed on lens 104. In another example, lens 104 may display the ball spin rate and/or launch angle. By displaying information to user 500 on eyeglasses 102, user 500 may reference this information without having to pull out a device or without having do anything other than look in front of his eye. Accordingly, the user may quickly and easily reference information without having to distract from other activities.

In some embodiments, system 100 may include a separate launch monitor configured to monitor and record data related to the golf ball, golf club, and/or golfer. For example, system 100 may include the launch monitor described in U.S. patent application Ser. No. 13/307,789, entitled Method and Apparatus for Determining an Angle of Attack from Multiple Ball Hitting, applied for by Ishii et al. and filed on Nov. 30, 2011, the disclosure of which is hereby incorporated by reference in its entirety. The separate launch monitor may be in communication with processor 202.

User tracking system 206 may determine the location of user 500. For example, in embodiments in which global positioning system receiver 120 is included in eyeglasses 102, global positioning system receiver 120 may determine the location of user and transmit the location of the user to processor 202. Processor 202 may be configured to know the locations of various landmarks on a golf course. Processor 202 may be configured to determine the distance between the location of the user and the various landmarks on the golf course. For example, processor 202 may be configured to determine the distance between user 500 and the next pin on the golf course. Processor 202 may be configured to display this distance to user 500, as shown in FIG. 7. In some embodiments, the user may be a golfer wearing eyeglasses 102. In some embodiments, the user may be a caddy wearing eyeglasses 102 and watching a golfer. The caddy may use the system to help the golfer choose clubs, adjust his swing, and find golf balls. In some embodiments, the user may be a spectator wearing the eyeglasses and watching a golfer.

In some embodiments, system 100 may display an image of golf ball 300 and/or an image of user 500 on a representation of the golf course. Display system 208 may display these images to user 500 on eyeglasses 102 to help user 500 navigate and/or locate golf ball 300. To display the images, system 100 may use the methods and components described in U.S. Patent Application Publication 2007/0021226, U.S. Patent Application Publication 2005/0233815, U.S. Patent Application Publication 2010/0151955, and/or U.S. Patent Application Publication 2008/0254916.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. An electronic golf aid system comprising:
   a user tracking system configured to determine the location of a user on a golf course;
   a heads up display configured to be worn on the user's head, the heads up display having a display screen with a transparent display area configured to display an image within a field of view of the user;

a reflective sensor configured to detect an object on the golf course; and a processor in communication with the user tracking system, the reflective sensor, and the heads up display, the processor being configured to:

determine a distance between the location of the user and the object on the golf course; and direct the heads up display to display a distance indication of the determined distance contemporaneous with an object indication superimposed over the object as the object is visible through the transparent display area of the display screen of the heads up display.

2. The electronic golf aid system of claim 1, wherein the object includes a pin on the golf course, and wherein a location of the pin is stored by the processor.

3. The electronic golf aid system of claim 1, wherein the object includes a golf ball, the golf aid system further comprising a golf ball tracking system in communication with the processor and configured to track the golf ball.

4. The electronic golf aid system of claim 3, wherein the golf ball tracking system is configured to determine one or more launch characteristics or flight characteristics, or both, of the golf ball.

5. The electronic golf aid system of claim 4, wherein the processor is further configured to provide a ball characteristic indication of the one or more determined launch characteristics or flight characteristics, or both, of the golf ball to the user via the heads up display.

6. The electronic golf aid system of claim 3, wherein the golf ball tracking system is configured to track a location of the golf ball relative to the user, and wherein the processor is further configured to provide the object indication as an indication of the location of the golf ball within the field of view of the user via the heads up display.

7. The electronic golf aid system of claim 6, wherein the object indication includes at least one of:

a comet tail trailing behind the location of the ball within the user's field of view; or an enhanced image of the golf ball that overlays the location of the golf ball within the user's field of view.

8. The electronic golf aid system of claim 3, wherein the golf ball includes one or more communication components and a microchip in communication with the golf ball tracking system, and wherein the golf ball tracking system is configured to determine the location of the golf ball on the golf course from signals emitted by the one or more communication components.

9. The electronic golf aid system of claim 1, wherein the reflective sensor includes is configured to detect the object using radar, LIDAR, optical sensing, or sonar, or any combination thereof.

10. The electronic golf aid system of claim 1, further comprising a camera configured to capture an image of the field of view of the user and transmit the image to the processor, the processor being further configured to determine from the captured image where to display the object indication superimposed over the object upon the user's field of view.

11. The electronic golf aid system of claim 1, wherein the display screen of the heads up display further includes a non-transparent display area configured to display images adjacent the field of view of the user.

12. An electronic golf aid device for assisting a user in determining distances on a golf course, the golf aid device comprising:

a headgear component configured to be worn on the head of the user;

a user tracking system attached to the headgear component and configured to determine a location of the user on the golf course;

a heads up display attached to the headgear component and configured to be worn in front of the user's eyes, the heads up display having a display screen with a transparent display area configured to display an image within a field of view of the user;

a reflective sensor attached to the headgear component and configured to detect a pin on the golf course; and a processor attached to the headgear component and in communication with the user tracking system, the reflective sensor, and the heads up display, the processor being configured to:

determine a distance between the location of the user and the pin on the golf course; and direct the heads up display to display a distance indication of the determined distance contemporaneous with a pin indication superimposed over the pin as the pin is visible through the transparent display area of the display screen of the heads up display.

13. The electronic golf aid device of claim 12, further comprising a golf ball tracking system in communication with the processor and configured to track a golf ball.

14. The electronic golf aid device of claim 13, wherein the golf ball tracking system is further configured to determine one or more launch characteristics or flight characteristics, or both, of the golf ball.

15. The electronic golf aid device of claim 14, wherein the processor is further configured to provide a ball characteristic indication of the one or more determined launch characteristics or flight characteristics, or both, of the golf ball to the user via the heads up display.

16. The electronic golf aid device of claim 13, wherein the golf ball tracking system is configured to track a location of the golf ball relative to the user, and wherein the processor is further configured to provide an object indication of the location of the golf ball within the field of view of the user via the heads up display.

17. The electronic golf aid device of claim 16, wherein the object indication includes at least one of:

a comet tail trailing behind the location of the ball within the user's field of view; or an enhanced image of the golf ball that overlays the location of the golf ball within the user's field of view.

18. The electronic golf aid device of claim 12, wherein the reflective sensor is configured to detect the pin using radar, LIDAR, optical sensing, or sonar, or any combination thereof.

19. The electronic golf aid device of claim 12, further comprising a camera configured to capture an image of the field of view of the user and transmit the image to the processor.

20. The electronic golf aid device of claim 12, wherein the display screen of the heads up display further includes a non-transparent display area configured to display images adjacent the field of view of the user.

* * * * *